United States Patent [19]
Chen

[11] Patent Number: 6,151,305
[45] Date of Patent: Nov. 21, 2000

[54] METHOD AND APPARATUS FOR PLANNING AN ATM NETWORK FOR AN AREA OF CONCENTRATED DEMAND FOR TRANSPORT BANDWIDTH

[75] Inventor: Jiang Chen, Nepean, Canada

[73] Assignee: Nortel Networks Limited, Montreal, Canada

[21] Appl. No.: 08/971,202

[22] Filed: Nov. 14, 1997

[51] Int. Cl.[7] .............................. H04L 12/56; G06F 15/20
[52] U.S. Cl. ...................... 370/238; 370/255; 370/396; 370/407; 709/241; 709/252
[58] Field of Search ..................... 370/229, 230, 370/231, 235, 237, 238, 254, 255, 256, 395, 396, 400, 401, 407, 408, 425; 709/232, 234, 235, 238, 239, 241, 252; 714/1, 2, 3, 4

[56] References Cited

U.S. PATENT DOCUMENTS

| | | | |
|---|---|---|---|
| 5,072,379 | 12/1991 | Eberhardt | 370/238 |
| 5,430,729 | 7/1995 | Rahnema | 370/238 |
| 5,491,690 | 2/1996 | Alfonsi et al. | 370/255 |
| 5,508,999 | 4/1996 | Cox et al. | 370/17 |
| 5,515,367 | 5/1996 | Cox et al. | 370/60 |
| 5,629,930 | 5/1997 | Beshai et al. | 370/396 |
| 5,940,372 | 8/1999 | Bertin et al. | 370/238 |

OTHER PUBLICATIONS

Yan, et al, Paper entitled "Designing an ATM–Based Broadband Network: an Overview", 1995 IEEE, pp. 245–251.

Fingerhut, et al, Paper entitled "Design of Nonblocking ATM Networks", Jan. 1996, pp. 1–16.

Fingerhut, et al, Paper entitled "Designing Minimum Cost Nonblocking Communication Networks", Feb. 1996, pp. 1–20.

Faragó, et al "A New Degree of Freedom in ATM Network Dimensioning: Optimizing the Logical Configuration", Sep. 1995, IEEE Journal on Selected Areas in Communication, pp. 1199–1205.

Badran, Hosein F., "Engineering of Multi–Service ATM Networks" IEEE symposium on Planning and Design of Broadband Networks, Montebello, Canada, Oct. 1996.

*Primary Examiner*—Alpus H. Hsu

[57] ABSTRACT

A method and apparatus for ATM network planning is described. ATM network planning involves designing an ATM network to support traffic demands, which may include voice, data, image and video traffic. It is desirable to design a backbone network for a metropolitan area which minimizes the total network cost. The design process includes the determination of network topology, location and configuration of switches, dimensioning of all links, etc. A heuristic method is described which provides a near-optimal lowest cost network design with the cost reasonably certain to be close to the optimal solution. The advantage is a versatile method which can reliably produce a lowest cost network plan in a reasonable time.

9 Claims, 3 Drawing Sheets

(Prior Art)

METHOD AND APPARATUS FOR PLANNING AN ATM NETWORK FOR AN AREA OF CONCENTRATED DEMAND FOR TRANSPORT BANDWIDTH

FIELD OF THE INVENTION

This invention relates generally to ATM network planning and, in particular, to a method and apparatus for planning ATM networks for areas of concentrated demand for transport bandwidth.

BACKGROUND OF THE INVENTION

ATM network planning involves designing a network equipped to satisfy all customers' traffic requirements, which may include the voice, data, image and video payloads. There are many issues to be considered in network planning. One well-known aspect of the planning process is the determination of the quantity, location and configuration of network access equipment required for the ingress and egress of customer traffic to the network. This process is usually referred to as Network Access Planning. Another well-known aspect is the design of an efficient backbone network for carrying network traffic. This is usually referred to as Network Backbone Planning. The network backbone may serve a metropolitan area or a larger geographical area.

There are also many performance issues related to ATM network planning, such as network survivability, qualities of service (QoS) and grades of service (GoS). Since all of these factors are interrelated in quite a complex manner, network planning is a complicated process. In order to facilitate the process, computerized tools have been invented to find optimal network design solutions given traffic demand and access switch locations. One such tool is taught in U.S. Pat. No. 5,508,999 which issued on Apr. 16, 1996 to Cox, Jr. et al. This patent teaches a method and system for generating an optimized transition plan for the placement and interconnection of carrier hubs in a local access network. Cox Jr. et al. use a mixed-integer programming for finding an optimal access network design.

The shortcomings of integer programming for use in network design are well known. Although such programming will find the optimal design, the time required to find the optimal solution is generally unacceptable for all but relatively small networks. In fact, for medium and large sized networks, the time involved in finding the optimal solution becomes prohibitive.

There therefore exists a need for a network planning method which is capable of finding an optimal or a near-optimal solution to a network design problem in a reasonable time. There also exists a need for a network planning method which is capable of finding an optimal lowest cost design solution for medium and large sized networks.

SUMMARY OF THE INVENTION

It is an object of the invention to provide a method of planning an ATM network which provides a near-optimal lowest cost solution in a reasonable time.

It is another object of the invention to provide a method and an apparatus for planning an ATM network for an area of concentrated demand for bandwidth, such as a metropolitan area.

It is yet another object of the invention to provide a method for planning an ATM network which utilizes an approximation technique for finding a solution by relaxing some of the constraints of the problem.

It is yet a further object of the invention to provide a method of planning an ATM network which yields a lowest cost solution that is reliably close to an optimal lowest cost.

These and other objects of the invention are realized in a method of planning an ATM network for an area of concentrated demand for bandwidth, comprising:
configuring homes in the network into a star topology having a single hub; and
linking together with direct links all pairs of homes having at least a predefined minimum of inter-nodal traffic.

In accordance with a further aspect of the invention, there is provided apparatus for planning an ATM network for an area of concentrated demand for transport bandwidth, the network plan being a near optimal lowest cost solution derived in a reasonable time, comprising:
means for storing codes representative of homes required to terminate customer traffic to the ATM network;
means for storing an aggregated projected customer demand between each pair of homes in the network;
means for storing an identifier to indicate that a one of the homes is designated as the home at which a hub for the network is to be located;
means for determining a number of direct links for interconnecting each pair of homes having a predefined minimum of projected inter-nodal customer traffic, and determining a size of each inter-nodal link required;
means for determining a total volume of customer traffic from each home to the hub and from the hub to each home;
means for determining a link size between each home and the hub without regard to interface termination requirements on the hub or the homes;
means for determining each home access switch and hub gateway switch configuration given all link sizes;
means for computing a total cost for the network plan and storing the cost in a memory along with a unique network plan identifier;
means for indicating another home as a hub location and recomputing a configuration and total network cost, and storing the total cost for the network plan until all homes have been designated as a hub and a total network cost is computed for each; and
means for examining the memory to select a lowest cost from among the total costs stored in the memory and displaying the lowest cost and the unique plan identifier for a user of the apparatus.

The invention therefore provides a method and an apparatus for designing an ATM network for an area of concentrated demand for transport bandwidth such as a metropolitan area. A network star topology modified in accordance with the invention is the most cost-effective architecture for an ATM network in a high-demand area of this type. Even though the modified star topology is adopted as a starting architecture, the network planning problem is still complex because all the design factors are inter-related. The optimal solution can be obtained only by considering all of the factors at the same time.

The invention therefore provides an approximation method for finding a solution by relaxing some of the constraints of the problem. The method and apparatus in accordance with the invention also provide a network planning solution which is reliably certain to be approximate the optimal lowest cost network plan. Usually the method provides a solution which is very near the optimal solution. The method can also provide a lowest cost network plan in a very reasonable time. In order to facilitate the design process, novel trunk dimensioning factors are used to reduce the search time for the best solution. These novel trunk dimensioning factors greatly facilitate planning, especially when the economy of the scale is significant.

In order to reduce computing time, the method imposes a practical restraint of permitting only two consecutive transport interfaces to exist for any given link. That practical constraint can be extended to other levels, but the problem becomes unwieldy if all the possible combinations of link interface are permitted to be used for determining link dimensions. The method can also be readily modified to provide a network design with a measure of network reliability by implementing redundant trunks and interface cards.

BRIEF DESCRIPTION OF THE DRAWINGS

The invention will now be further explained by way of example only, and with reference to the following drawings, wherein.

DETAILED DESCRIPTION OF THE PREFERRED EMBODIMENT

Before describing the invention in detail, some important concepts are briefly discussed.

A node is a central switching office which can terminate different types of customer services. Each node's location is typically represented by its geographical coordinates, such as longitude and latitude, or V & H coordinates (in North America). In order to accommodate the ingress and egress of network traffic, access switches are required at some nodes where the volume of customer traffic is adequate to warrant such switches. Nodes with access switches are referred to as "homes". Hub switches are also used to carry custom traffic through the network and serve as gateways to move customer traffic to other networks, such as a SONET ring. A node with at least one hub switch is referred to as a "hub". Usually a hub switch has a higher capacity than an access switch.

Figure 1:
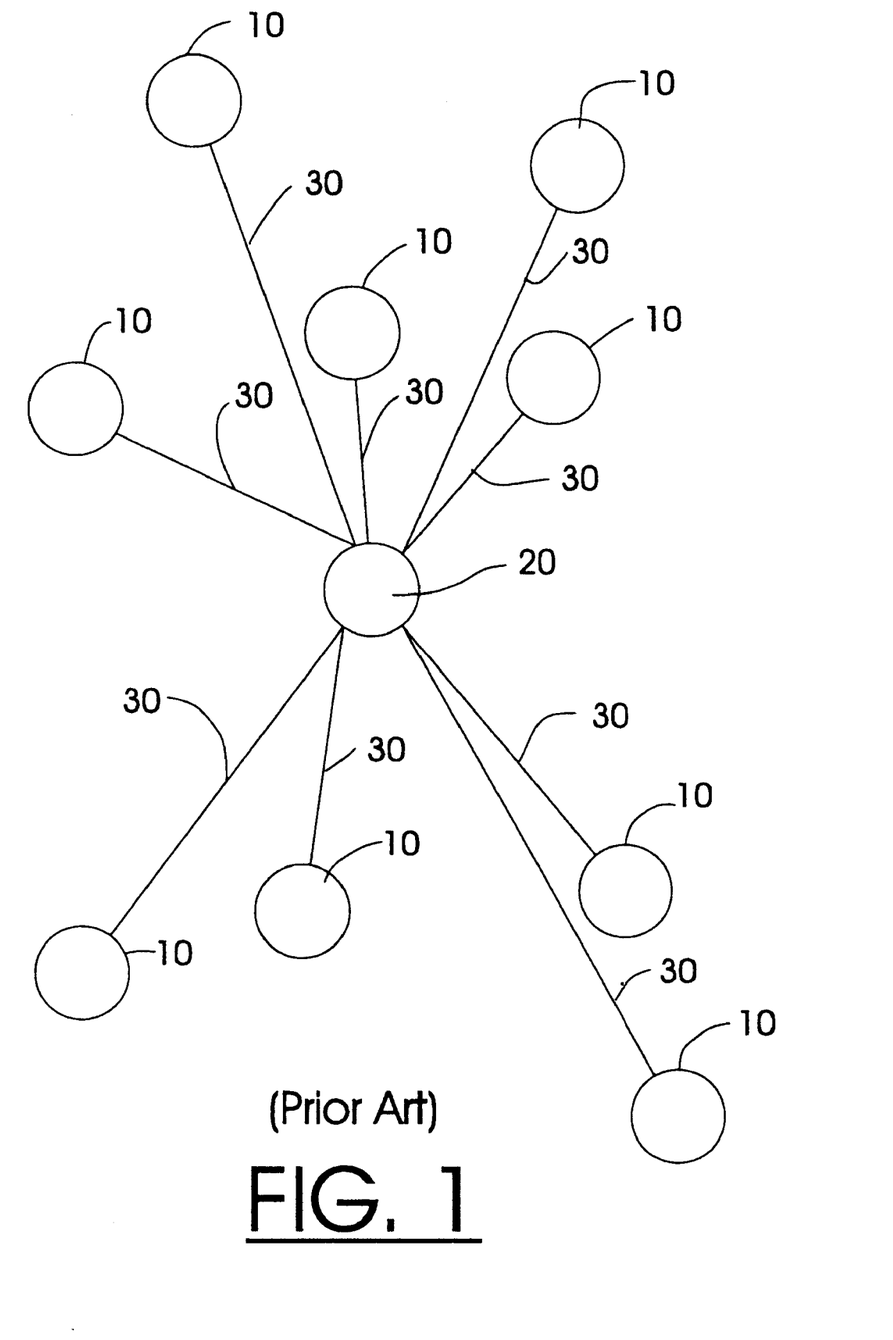
FIG. 1 is a schematic diagram of an ATM network configured in a star topology in accordance with the prior art.

For areas of concentrated demand for bandwidth, such as metropolitan regions, it is accepted and may be established by proof that the optimal network solution where transport cost is a constant, is a star topology. A prior art star topology is shown in FIG. 1. Nine homes 10 are connected by links 30 to a hub 20 in a prior art star topology network design.

Figure 2:
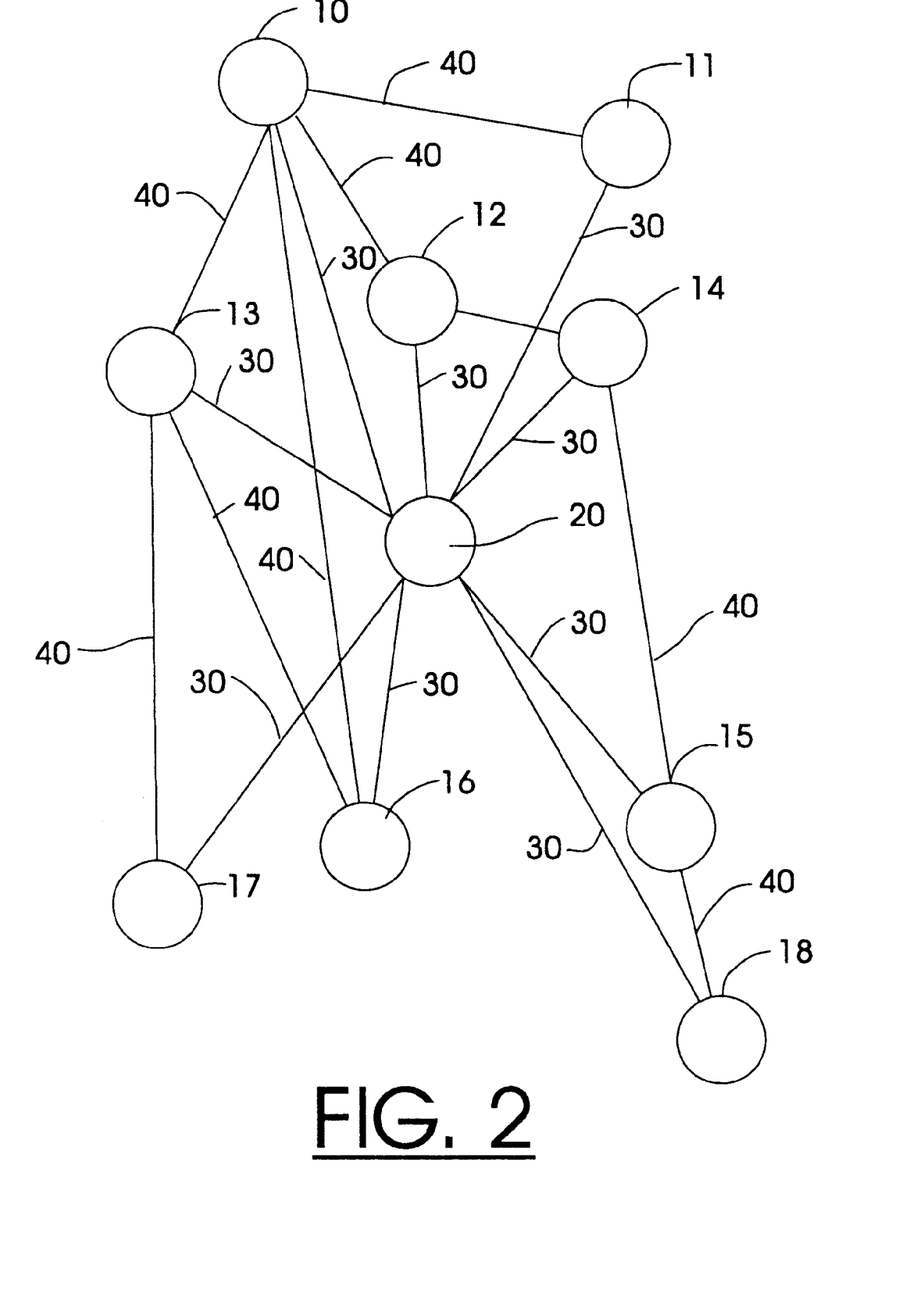
FIG. 2 is a schematic diagram of an ATM network configured in a design in accordance with the invention.

FIG. 2 is a schematic diagram illustrating a modified star topology design in accordance with the invention. In the modified network design, nine homes 10–18 are connected by links 30 to a hub 20. In addition, each home having adequate inter-nodal traffic has a direct link 40 with the other home where the inter-nodal traffic originates. For example, home 10 is linked directly to homes 11, 12, 13 and 16. Home 13 is linked directly to homes 10, 16 and 17; and home 15 is linked directly to homes 14 and 18. The modified star topology shown in FIG. 2 improves network survivability and provides least cost network solution because the required capacity at the hub is reduced without increasing the required capacity at the homes 10–18, and data is transported over the shortest distance.

Figure 3:
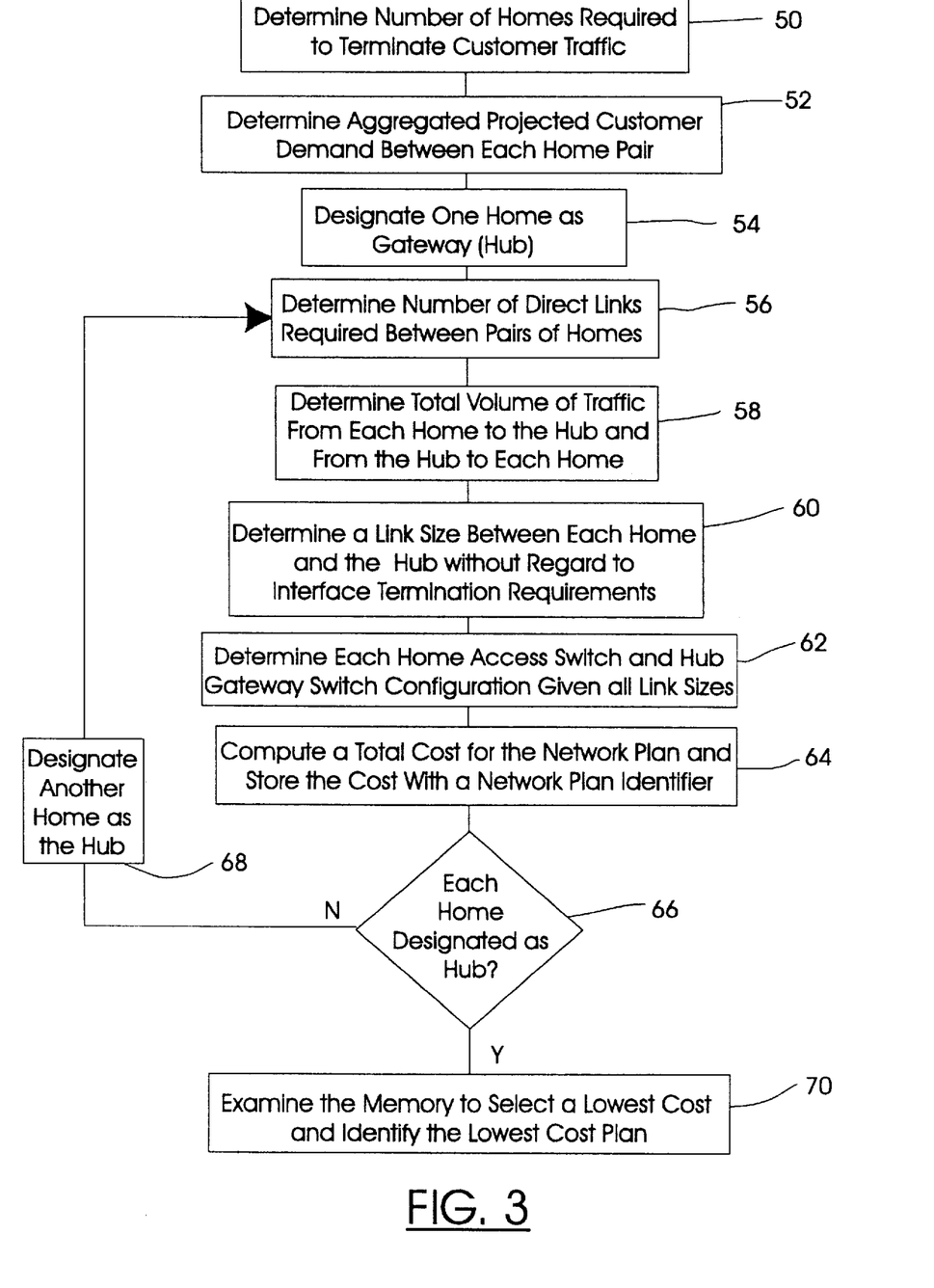
FIG. 3 is a flow diagram of the principal steps involved in practising the method of designing an ATM network in accordance with the invention.

FIG. 3 is a flow chart of the principal steps involved in designing a network using the method and apparatus in accordance with the invention. In step 50, the number of homes required to terminate customer traffic is determined. This information is normally supplied by the party for whom a network is being designed and is generally dictated by the existing infrastructure of the metropolitan region in which the network is required. In addition to the number of homes required, it is also necessary to determine the aggregated projected customer demand between each home pair in step 52. This is also information normally provided by the party for whom the network is being designed. After that information has been assembled and input to the apparatus in accordance with the invention, any given home is designated as a hub for the network.

The home designated as a hub in step 54 may be arbitrarily selected since each home 10–18 (see FIG. 2) will be evaluated as a hub 20 for the gateway. The first home designated as a hub 20, home 10, for example, is input to the apparatus in accordance with the invention in step 54. Alternatively, the apparatus may be programmed to automatically designate a home 10–18 as hub 20, as will be understood by those skilled in the art.

In step 56, the number of direct links required between pairs of homes 10–18 is computed using the aggregate projected customer demand between each home pair determined in step 52. The process for computing the number of direct links required between pairs of homes 10–18 is described below in detail. In step 60, a link size between each home 10–18 and the hub 20 is determined without regard to interface termination requirements, as will also be explained below in some detail. In step 62, computation is made to determine the configuration of the access switch at each home 10–18 and the gateway switch at the hub 20 given all the link sizes computed in steps 56 and 60. In step 64, a total cost for the network plan is computed and stored in the memory of the apparatus in accordance with the invention, along with a network plan identifier which may, for example, be the home name or identification number, or any other network plan identifier conveniently assigned. In step 66, the memory is examined to determine whether each home 10–18 has been designated as a hub 20. If not, another home 10–18 is designated as the hub 20 in step 68 and the process returns to step 56 where a re-evaluation of the number of direct links required between pairs of homes 10–18 is undertaken in view of the new position of the hub 20 and the processes involved in steps 58–66 are repeated until each home 10–18 has been designated as the hub 20. After each home 10–18 has been designated as a hub 20 and a total cost for the network plan has been computed for each location of the hub 20, memory is examined to select the least cost network plan in step 70 and identify the lowest cost plan. The cost of the lowest cost plan is displayed to an operator of the apparatus along with the unique network plan identifier to permit the operator to implement the plan. The apparatus in accordance with the invention may be any computing machine capable of being programmed to perform the computing operations described below.

A detailed description of the computations involved in deriving the lowest cost network plan is now set forth in detail.

The invention provides a method for designing a backbone network for an area of concentrated demand for bandwidth, such as a metropolitan region. The design problem can be described as follows. There are n homes in the network. Each home's location is given by its geographical coordinates or by its relative distance from every other home in the proposed network. The total traffic demand from home i to home j is $COI_{i,j}$ Megabits per second (Mbps)(i,j=1, . . . ,n; i≠j). The traffic demand from home i to outside the network is $COI_{i,outside}$ (i=1, . . . ,n). The traffic demand from outside the network to home i is $COI_{outside,i}$ (i=1, . . . ,n). Since different customer services have different traffic characteristics, the traffic demand is referred to as a bandwidth requirement on the backbone network.

Trunks are interswitch links used to transport customer traffic between switches. There are m different types of transport interfaces, called link-types, which can be used for dimensioning a trunk. Examples are OC48, OC12, OC3, DS3 and DS1. The kth link-type has transport capacity $Q_k$ Mbps (k=1, . . . ,m). For example, one OC48 can carry up to 2480 Mbps. The maximum bandwidth utilization for each trunk is represented by $\eta(0<\eta<1)$. The transport cost from home i to j for one unit link-type k includes a fixed cost $A_k$ and a variable cost $T_{i,j,k}$ per unit of distance spanned by the link.

In general, the position of each home is dictated by customer demand for bandwidth. The location of the homes in the network are therefore known at an early phase of access network planning. Most access switches and hub switches have the capacity to terminate several different transport link-types. Different transport link-types require different cards in the switches on which to terminate. For any given link-type, the card used for termination on an access switch is different from that used on a hub switch. One card for the access switch has $n_k$ ports for terminating the link-type k, with a cost of $c_k$ (k=1, . . . ,m). The kth link-type card for the hub switch has $N_k$ ports with a cost of $C_k$ (k=1, . . . ,m). In accordance with the invention, it is assumed that there is one type of hub switch and it has enough capacity to handle all network traffic. The hub switch starting cost (without any cards) is C.

The other assumptions are:

1. Direct links are used between homes where inter-nodal traffic warrants, and network traffic demand does not include traffic carried by the direct links between homes.

If there is significant traffic from one home to another, then a trunk is provided between them to absorb at least a majority of that traffic. The requirement for direct trunks is easily identified by examining the volume of projected traffic between each pair of homes.

2. The network includes at least one hub, which is located at one of the homes.

3. Transport economy of scale is:

$$T_{i,j,k} < (Q_k/Q_{k+1})T_{i,j,k+1};$$

for i, j=1, . . . n; k=1, . . . ,m−1.

4. Equipment economy of scale is:

$$c_k/n_k < (Q_k/Q_{k-1})c_{k+1}/n_{k+1} \text{ and } C_k/N_k < (Q_k/Q_{k+1})C_{k+1}/N_{k+1} \; k=1, \ldots, m-1.$$

5. Practical constraint 1:

The threshold to upgrade link-type k is $\Delta_k$ (k=2, . . . m).

6. Practical constraint 2:

At most two consecutive link-types can be used to dimension a trunk.

The objective is to determine a feasible network topology and find an optimal design which minimizes total network cost for the given bandwidth demand. Traffic distribution outside the network is not considered, and the cost of implementing cards required to connect the network to other networks is not addressed.

The cost of constructing an ATM network includes transport costs and equipment costs. These costs influence network design in a complex way.

Transport cost is determined by the number, location, length and link-type of all trunks in the network. The equipment cost is determined by the number of each type of card required in each home/hub. Transport cost is also associated with the trunks since the same link-types of different trunks can share interface cards at the hub switch. Therefore, an optimal lowest cost solution can only be found by considering all the trunk issues at the same time. This complicates the network design process.

In order to arrive at a practical solution in a reasonable time, a relaxed approach to the design problem is used in which each link interface is provisioned on a proportional per-port-usage basis at each switch, i.e., each port on a card is assumed to incur a proportional cost. For example, if one OC3 card on the hub switch has three OC3 ports and a card cost of $9,000, then each OC3 port is provisioned at a cost of $3,000 in the relaxed approach to the design problem. This makes trunk dimensioning more manageable.

A plurality of low capacity link-types should be upgraded to a higher capacity because of the economy of scale. In order to determine at what level the upgrade should occur, a variable $a_{i,h,k}$ is used to represent the minimum number of the kth link-types required in a trunk from home i to the hub h before a link-type upgrade is warranted. Further, it is assumed that $a_{i,h,k}=q\,n_k$, where q is an integer.

This means that $a_{i,h,k}$ kth link-type ports require exactly q cards on the access switch. This also implies that there should be less than $a_{i,h,k}$ kth link-types in a trunk. The use of the variable $a_{i,h,k}$ helps to reduce the search time required to find an optimal solution to the design problem, especially when the economy of scale is significant.

In the relaxed approach to the design problem, the maximum number of kth link-type in any trunk should be:

$$a_{i,h,k} < \min\{LCM\{n_k, n_{k-1}\}Q_{k-1}/Q_k, \Delta_k\}$$

where LCM represents the Least Common Multiple of Integers (x, y).

This can be demonstrated if one assumes there is a trunk which does not satisfy this statement in its optimal dimensioning. This implies that there are at least $LCM\{n_k,n_{k-1}\}Q_{k-1}/Q_k$ kth link-types in the trunk. An alternate solution can be constructed in such a way that the $LCM\{n_k,n_{k-1}\}Q_{k-1}/Q_k$ of the total number of kth link-types is upgraded to $LCM\{n_k,n_{k-1}\}$ (k−1)th link-types while the others are kept the same. The number of (k−1)th link-type cards needed at the access switch is $LCM\{n_k,n_{k-1}\}/n_{k-1}$.

The equipment cost associated with upgrading in the original solution is:

$$\frac{c_k}{n_k}\frac{Q_{k-1}}{Q_k}LCM(n_k, n_{k-1}) + \frac{C_k}{N_k}\frac{Q_{k-1}}{Q_k}LCM(n_k, n_{k-1}) \qquad (4.1)$$

The transport costs associated with the upgrading in the original solution is:

$$(A_k + D_{i,h}T_{i,h,k})LCM(n_k, n_{k-1})\frac{Q_{k-1}}{Q_k} \qquad (4.2)$$

Combining (1) and (2), we see that the total cost associated with upgrading in the original solution is:

$$\left(\frac{c_k}{n_k} + \frac{c_k}{N_k} + A_k + D_{i,h}T_{i,h,k}\right)LCM(n_k, n_{k-1})\frac{Q_{k-1}}{Q_k} \qquad (4.3)$$

Since there are $LCM\{n_k,n_{k-1}\}/n_{k-1}$ newly upgraded (k−1) th link-types in the alternative solution, the total cost associated with upgrading can be similarly obtained:

$$\left(\frac{c_{k-1}}{n_{k-1}} + \frac{c_{k-1}}{N_{k-1}} + A_{k-1} + D_{i,h}T_{i,h,k-1}\right)LCM(n_k, n_{k-1}) \qquad (4.4)$$

Comparing (4.3) and (4.4) and using the economic scale assumptions, we can see that the alternative solution results in a lower cost.

In accordance with the method of this invention, if the hub location h is given in the relaxed approach to the design problem, $a_{i,h,k}$ (i–1, ... ,n; k=1, ... m) can be obtained in:

$$O\left(n\sum_{k=1}^{m}\min\left\{\frac{Q_{k-1}}{Q_k}LCM(n_k, n_{k-1}), \Delta_k\right\}/n_k\right) \text{ time.}$$

The assumption $a_{i,h,k}=qn_k$, where q is an integer, implies that only q cards are needed for the termination of the kth link-type at the access switch and $a_{i,h,k}$ ports are needed at the hub switch. Combining the transport cost and equipment cost, the total cost for link-type k can be computed with:

$$qc_k+a_{i,j,k}C_k/N_k+a_{i,h,k}(A_k+D_{i,h}T_{i,h,k}). \quad (4.5)$$

If all the $a_{i,h,k}$ are upgraded, the number of (k–1)th link-type ports required should be $\lceil a_{i,h,k}/(Q_{k-1}/Q_k)\rceil$. Therefore the total cost for the newly upgraded link-type (k–1) is:

$$c_{K-1}\left[\left\lceil\frac{a_{i,h,k}}{(Q_{k-1}/Q_k)}\right\rceil/n_{k-1}\right]+ \quad (4.6)$$

$$\frac{c_{K-1}}{N_{k-1}}\left[\frac{a_{i,h,k}}{(Q_{k-1}/Q_k)}+(A_k+D_{i,h}T_{i,h,k-1})\left\lceil\frac{a_{i,h,k}}{(Q_{k-1}/Q_k)}\right\rceil\right]$$

Comparing the result of (4.5) and (4.6), the minimum $a_{i,h,k}$ which makes (4.6) less than or equal to (4.5) can be found by iteratively increasing q by one. Since:

$$a_{i,h,k} = qn_k \leq \min\left\{\frac{Q_{k-1}}{Q_k}LCM(n_k, n_{k-1}), \Delta_k\right\},$$

the time needed to complete the search is:

$$O\left(n\sum_{k=1}^{m}\min\left\{\frac{Q_{k-1}}{Q_k}LCM(n_k, n_{k-1}), \Delta_k\right\}/n_k\right).$$

Since there are at most two consecutive link-type levels in any trunk, the second level is determined automatically once the first level is known.

It can also be demonstrated that if traffic in a trunk from home i to the hub h is Q (maximum load in both directions) in the relaxed approach to the design problem and the first link-type level is k, then the trunk can be dimensioned in $O(\min\{n_k,n_{k-1}\}Q_{k-1}/Q_k,\Delta_k\})$ time.

Since the first level is k, at least one unit of kth link-type should be used, which means that at least one kth card is required at the home.

One kth link-type has a bandwidth of $Q_k$, therefore $\lceil Q/(Q_k\eta)\rceil$ is the maximum number of kth link-types that are required in the trunk.

If $Q/(Q_k\eta)\geq a_{i,h,k}$, a higher level of link-type should be used. Otherwise, it is assumed there are $X_k$ first link-types being used, which implies that the traffic that can be carried is $X_kQ_k\eta$. The remaining traffic should be $Q-X_kQ_k\eta$. The number of link-types of the next level needed should be $\lceil(Q-X_kQ_k\eta)/(Q_{k+1}\eta)\rceil$.

Therefore, the number of cards required for link-type k is $\lceil X_k/n_k\rceil$ and the number of service cards for the next link-type is $\lceil\lceil Q-X_kQ_k\eta)/(Q_{k+1}\eta)\rceil/n_{k+1}\rceil$. The total card cost in the access switch is:

$$\lceil X_k/n_k\rceil c_k+\lceil\lceil(Q-X_kQ_k\eta)/(Q_{k+1}\eta)\rceil/n_{k+1}\rceil C_{k+1}.$$

The card cost of the hub switch is:

$$X_kC_k/N_k+\lceil(Q-X_kQ_k\eta)/(Q_{k+1}\eta)\rceil C_{k+1}/N_{k+1}.$$

Taking the transport cost into consideration, the total cost for this solution is:

$$\left\lceil\frac{X_k}{n_k}\right\rceil c_k+\left\lceil\left\lceil\frac{Q-X_kQ_k\eta}{Q_{k+1}\eta}\right\rceil/n_{k+1}\right\rceil c_{k+1}+X_k\frac{C_k}{N_k}+$$

$$X_k(A_k+D_{i,h}T_{i,h,k})+\left(\frac{C_{k+1}}{N_{k+1}}+A_{k+1}+D_{i,h}T_{i,h,k+1}\right)\left\lceil\frac{Q-X_kQ_k\eta}{Q_{k+1}\eta}\right\rceil$$

Therefore, the lowest cost solution can be obtained by finding the minimum cost of (4.7) by iteratively increasing $X_y$ by one.

As explained above, the maximum number of kth link-types in a trunk group is:

$$a_{i,h,k}<\min\{LCM\{n_k,n_{k-1}\}Q_{k-1}/Q_k,\Delta_k\}.$$

Therefore, the total time needed to find the optimal dimension for a trunk is:

$$O(\min\{LCM\{n_k,n_{k-1}\}Q_{k-1}/Q_k,\Delta_k\}) \text{ time.}$$

For a given trunk traffic demand Q, the optimal dimension for the trunk can be obtained by letting k=1, ... ,m in the relaxed approach to the design problem for finding $a_{i,k,k-1}$ described above.

If the traffic is known for all the trunks in the relaxed approach to the design problem for a given hub location, all the optimal trunk dimensions can be determined in:

$$O\left(n\sum_{k=1}^{m}\min\left\{\frac{Q_{k-1}}{Q_k}LCM(n_k, n_{k-1}), \Delta_k\right\}\right)$$

Since there are n potential hubs in the network, the best network solution for the relaxed approach to the design problem can be obtained by changing the hub location h–1, ... ,n. Using the best solution data, we can obtain a reasonable lowest cost solution by removing the relaxed assumption that each transport interface card could be provisioned on a proportional per-port-usage basis at the hub switch. For example, assume one OC3 card has three ports and one DS3 card has two ports and there are 2OC3 and 1DS3 in the best solution, then the cost of only ⅔ of an OC3 card and ½ of a DS3 card is incurred in the cost computation of the lowest cost solution. The feasible solution will include the cost of one OC3 card and one DS3 card.

It can be mathematically demonstrated that cost of the feasible solution is very close to the optimal lowest cost solution to the original design problem, and the solution can be obtained quickly.

The network cost of the feasible solution is within:

$$\sum_{k=1}^{m}C_k\frac{N_k-1}{N_k}$$

to that of an optimal lowest cost solution for the original problem and it can be obtained in:

$$O\left(n^2\sum_{k=1}^{m}\min\left\{\frac{Q_{k-1}}{Q_k}LCM(n_k, n_{k-1}), \Delta_k\right\}\right) \text{ time.}$$

By way of demonstration, let $Y_{i,h,k}$ be the number of kth link-types in the optimal solution to the original problem for the trunk, from home i to the optimal hub location h*(i=1, ... ,n; k=1, ... ,m). Also assume $Z_{i,h,k}$ is the number of kth link-types in the relaxed approach to the design problem for the trunk from home i to the optimal hub location $h^*(i=1, \ldots, n; k=1, \ldots, m)$.

The equipment cost in the optimal solution is:

$$\sum_{i=1}^{n}\sum_{k=1}^{m} c_k \lceil Y_{i,h^*,k}/n_k \rceil + \sum_{k=1}^{m} C_k \left[\sum_{i=1}^{n} Y_{i,h^*,k}/N_k\right] + C \quad (4.7)$$

The transport cost in the optimal solution is:

$$\sum_{i=1}^{n}\sum_{k=1}^{m} (A_k + D_{i,h^*} T_{i,h^*,k}) Y_{i,h^*,k} \quad (4.8)$$

Let $COST_{opt}^*$ represent the total cost for the optimal solution, therefore:

$$COST_{opt} = \sum_{i=1}^{n}\sum_{k=1}^{m} c_k \lceil Y_{i,h^*,k}/n_k \rceil + \sum_{k=1}^{m} C_k \left[\sum_{i=1}^{n} Y_{i,h^*,k}/N_k\right] + \quad (4.9)$$

$$\sum_{i=1}^{n}\sum_{k=1}^{m} (A_k + D_{i,h^*} T_{i,h^*,k}) Y_{i,h^*,k} + C \geq$$

$$\sum_{i=1}^{n}\sum_{k=1}^{m} c_k \lceil Y_{i,h^*,k}/n_k \rceil + \sum_{k=1}^{m} C_k \left(\sum_{i=1}^{n} Y_{i,h^*,k}/N_k\right) +$$

$$\sum_{i=1}^{n}\sum_{k=1}^{m} (A_k + D_{i,h^*} T_{i,h^*,k}) Y_{i,h^*,k} + C$$

Let $COST_{relax}$ represent the feasible solution's cost, it should be less than or equal to the cost of the problem when $h=h^*$. Therefore, we have:

$$COST_{relax} \leq \sum_{i=1}^{n}\sum_{k=1}^{m} c_k \lceil Z_{i,h^*,k}/n_k \rceil + \sum_{k=1}^{m} C_k \left[\sum_{i=1}^{n} Z_{i,h^*,k}/N_K\right] + \quad (4.10)$$

$$\sum_{i=1}^{n}\sum_{k=1}^{m} (A_k + D_{i,h^*} T_{i,h^*,k}) Z_{i,h^*,k} + C$$

$$\leq \sum_{i=1}^{n}\sum_{k=1}^{m} c_k \lceil Z_{i,h^*,k}/n_k \rceil + \sum_{k=1}^{m} C_k \left(\sum_{i=1}^{n} Z_{i,h^*,k}/N_k\right) +$$

$$\sum_{i=1}^{n}\sum_{k=1}^{m} (A_k + D_{i,h^*} T_{i,h^*,k}) Z_{i,h^*,k} + C + \sum_{k=1}^{m} (N_k - 1)/N_k$$

$$\leq \sum_{i=1}^{n}\sum_{k=1}^{m} c_k \lceil Y_{i,h^*,k}/n_k \rceil + \sum_{k=1}^{m} C_k \left(\sum_{i=1}^{n} Y_{i,h^*,k}/N_k\right) +$$

$$\sum_{i=1}^{n}\sum_{k=1}^{m} (A_k + D_{i,h^*} T_{i,h^*,k}) Y_{i,h^*,k} + C + \sum_{k=1}^{m} (N_k - 1)/N_k$$

The second last inequality follows from the fact that:

$$C_k \left[\sum_{i=1}^{n} Z_{i,h^*,k}/N_k\right] \leq C_k \sum_{i=1}^{n} Z_{i,h^*,k}/N_k + C_k(N_k - 1)/N_k.$$

The last inequality arises from the above demonstration that if traffic is known for all the trunks in the relaxed approach to the design problem for a given hub location, all the optimal trunk dimension can be determined in:

$$O\left(n \sum_{k=1}^{m} \min\left\{\frac{Q_{k-1}}{Q_k} LCM(n_k, n_{k-1}), \Delta_k\right\}\right).$$

Comparing (4.9) with (4.10), we have:

$$COST_{relax} \leq COST_{opt} + \sum_{k=1}^{m} C_k(N_k - 1)/N_k$$

The traffic for dimensioning the trunk from home i to the hub should be a maximum of the bidirectional traffic which is:

$$\max\left\{\sum_{j=1}^{n} COI_{j,i} + COI_{outside,i}, \sum_{j=1}^{n} COI_{i,j} + COI_{i,outside}\right\}$$

It takes O(n) time to calculate the traffic for a particular trunk. Because there are n trunks in the network, the traffic for all trunks can be calculated in $O(n^2)$ time. Since hub location is changed from 1 to n to find the lowest cost solution, the lowest cost feasible solution can be obtained in:

$$O\left(n^2 \sum_{k=1}^{m} \min\left\{\frac{Q_{k-1}}{Q_k} LCM(n_k, n_{k-1}), \Delta_k\right\}\right).$$

The following example illustrates the process of finding the best solution to the relaxed approach to a network design problem.

EXAMPLE 1

Assume there is a metropolitan area network to be designed in which there are n=10 homes with access switches, i.e., CO1, CO2, CO3, CO4, CO5, CO6, CO7, CO8, CO9, CO10. As per the invention, a modified star topology is used. The coordinates of each home are given below.

Nodes Information

TABLE 1

| | | | | | Home Locations | | | | | |
|---|---|---|---|---|---|---|---|---|---|---|
| | CO1 | CO2 | CO3 | CO4 | CO5 | CO6 | CO7 | CO8 | CO9 | CO10 |
| V | 1000 | 1040 | 1020 | 1000 | 980 | 960 | 980 | 1000 | 1020 | 1040 |
| H | 1000 | 1000 | 1020 | 1040 | 1020 | 1000 | 980 | 960 | 980 | 1040 |

Therefore, the distance between each home can be calculated:

TABLE 2

Distances between homes in the network

| $D_{ij}$ | CO1 | CO2 | CO3 | CO4 | CO5 | CO6 | CO7 | CO8 | CO9 | CO10 |
|---|---|---|---|---|---|---|---|---|---|---|
| CO1 | 0 | 40 | 28 | 40 | 28 | 40 | 28 | 40 | 28 | 56 |
| CO2 | 40 | 0 | 28 | 56 | 63 | 80 | 63 | 56 | 28 | 40 |
| CO3 | 28 | 28 | 0 | 28 | 40 | 63 | 56 | 63 | 40 | 28 |
| CO4 | 40 | 56 | 28 | 0 | 28 | 56 | 63 | 80 | 63 | 40 |
| CO5 | 28 | 63 | 40 | 28 | 0 | 28 | 40 | 63 | 56 | 63 |
| CO6 | 40 | 80 | 63 | 56 | 28 | 0 | 28 | 56 | 63 | 90 |
| CO7 | 28 | 63 | 56 | 63 | 40 | 28 | 0 | 28 | 40 | 84 |
| CO8 | 40 | 56 | 63 | 80 | 63 | 56 | 28 | 0 | 28 | 90 |
| CO9 | 28 | 28 | 40 | 63 | 56 | 63 | 40 | 28 | 0 | 63 |
| CO10 | 56 | 40 | 28 | 40 | 63 | 90 | 84 | 90 | 63 | 0 |

Network Traffic Description

The access switches in each home support different customer services. These services include frame relay, ethernet, token ring, FDDI and video applications. Each service protocol is converted into ATM format at the access switch. The total equivalent bandwidth requirements (Mbps) from each home to other homes is determined to be as shown in Table 3.

TABLE 3

Traffic Demand in the network

|  | CO1 | CO2 | CO3 | CO4 | CO5 | CO6 | CO7 | CO8 | CO9 | CO10 |
|---|---|---|---|---|---|---|---|---|---|---|
| CO1 | — | 40 | 35 | 50 | 46 | 28 | 30 | 12 | 9 | 1.5 |
| CO2 | 60 | — | 2 | 8 | 12 | 18 | 21 | 16 | 10 | 0.1 |
| CO3 | 20 | 23 | — | 18 | 2.3 | 41 | 24 | 16 | 5.0 | 1.2 |
| CO4 | 28 | 15 | 36 | — | 8 | 23 | 2 | 23 | 12 | 1.0 |
| CO5 | 47 | 14 | 17 | 19 | — | 21 | 6 | 1 | 9 | 2.1 |
| CO6 | 86 | 18 | 10 | 34 | 6 | — | 8 | 12 | 7 | 1.2 |
| CO7 | 29 | 27 | 34 | 27 | 50 | 2 | — | 5 | 4 | 0.5 |
| CO8 | 10 | 19 | 28 | 23 | 9 | 4 | 12 | — | 10 | 0.3 |
| CO9 | 11 | 12 | 20 | 9.0 | 7 | 8 | 8 | 2 | — | 0.4 |
| CO10 | 0.5 | 1.8 | 0.2 | 0.5 | 1.4 | 1.5 | 0.7 | 0.1 | 0.8 | — |

The traffic from outside the network to each home and the traffic from each home to outside the network is expressed in Mbps and summarized in Table 4.

TABLE 4

Traffic demand between network nodes and outside the network

| traffic/CO | CO1 | CO2 | CO3 | CO4 | CO5 | CO6 | CO7 | CO8 | CO9 | CO10 |
|---|---|---|---|---|---|---|---|---|---|---|
| In-Net | 300 | 109 | 87 | 35 | 60 | 40 | 50 | 20 | 15 | 1.6 |
| Out-Net | 308 | 121 | 91 | 72 | 83 | 56 | 76 | 45 | 9 | 1.5 |

Transport Description and Network Equipment

Assume there are five transport link-types which can be used in each trunk: the first is OC48 with a transport capacity $Q_1$=2480 Mbps; the second is OC12 with a capacity $Q_2$=620 Mbps; the third is OC3 with a capacity $Q_3$=155 Mbps; the fourth is DS3 with a capacity $Q_4$=45 Mbps; and the fifth is DS1 with a capacity $Q_5$=1.5 Mbps. The maximum trunk utilization is assumed to be $\eta$=75%. The upper limit for the number of different interfaces in a trunk are:

$\Delta_2$=5(OC12), $\Delta_3$=4(OC3), $\Delta_4$=6(DS3), and $\Delta_5$=16(DS1).

The fixed transport cost are $A_1$=$10,000; $A_2$=$5,000; $A_3$=$2,000; $A_4$=$1,000; and $A_5$=$500. The variable transport cost per unit distance is assumed to be $T_{i,j,1}$=$1,000; $T_{i,j,2}$=$500; $T_{i,j,3}$=$200; $T_{i,j,4}$=$100; and $T_{i,j,5}$=$500 for i,j=1,2, . . . ,10.

There are five corresponding cards available for the access switches and the hub switches. Their configurations can be described as follows:

For the access switches, one OC48 card has $n_1$=1 port with a card cost $c_1$=$80,000; one OC12 card has $n_2$=2 ports with a card cost $c_2$=$60,000; one OC3 card can terminate $n_3$=3 ports with a card cost $c_3$=$50,000; one DS3 has $n_4$=3 ports with a card cost $c_4$=$40,000; and one DS1 card has $n_5$=10 ports with a card cost $c_5$=$10,000.

For the hub switch, one OC48 card has $N_1$=1 ports with a card cost $C_1$=$100,000; one OC12 card has $N_2$=2 ports with a card cost $C_2$=$100,000; one OC3 card has $N_3$=4 ports with a card cost $C_3$=$45,000; one DS3 card has $N_4$=4 ports with a card cost $C_4$=$24,000; and one DS1 card has $N_5$=8 ports with a card cost $C_5=\$3,200$. The starting cost for the hub switch is $C=\$200,000$.

For the relaxed approach to the design problem, we assume that the interface requirement could be provisioned on a per-port basis on the hub switch. This implies that one OC48 port can be provisioned at a cost of $C_1/N_1=\$100,000$; one OC12 port could be provisioned at a cost of $C_2/N_2=\$40,000$; one OC3 port could be provisioned at a cost of $C_3/N_3=\$11,250$; one DS3 port could be provisioned at a cost of $C_4/N_4=\$6,000$; and one DS1 port could be provisioned at a cost of $C_5/N_5=\$400$.

Network Design Process

Assume the hub position is located at home 1, i.e., CO1 (h=1). The design process can be completed by the following steps.

1. Obtain the traffic at each trunk:

$$Q_1 = \max\left\{\sum_{i=1}^{10} COI_{i,1} + COI_{outside,1}, \sum_{i=1}^{10} COI_{1,i} + COI_{1,outside}\right\} = 826.5 \text{ Mbps}.$$

Similarly, we can calculate $Q_2=378.8$ Mbps; $Q_3=301.5$ Mbps; $Q_4=261$ Mbps; $Q_5=253.1$ Mbps; $Q_6=238.2$ Mbps; $Q_7=254.5$ Mbps; $Q_8=160$ Mbps; $Q_9=86.4$ Mbps; and $Q_{10}=9.9$ Mbps.

2. Obtain the factors $a_{i,h,k}$, for i=1, . . . ,10; h=1; k=2, . . . ,5

The values of $a_{i,h,k}$ can be calculated for i=1, . . . ,10; k=2, . . . ,5 as described above.

Therefore, the network cost from the above trunk sizes for the given hub location is:

$$\sum_{i=1}^{10}\sum_{k=1}^{5} c_k\lceil Z_{i,1,k}/n_k\rceil + \sum_{k=1}^{5}\left((C_k/N_k)\sum_{i=1}^{10} Z_{i,1,k}\right) +$$
$$\sum_{i=1}^{10}\sum_{k=1}^{5}(A_k + D_{i,1}T_{i,1,k})Z_{i,1,k} = \$1,208,600.$$

Similarly, the other network cost can be calculated as the hub location is changed from h-2 to 10. The best solution is the solution with the lowest network cost. As demonstrated above, the reasonable solution will be within the:

$$\sum_{k=1}^{5} C_k N_k - \frac{1}{N_k} = \$94,550,$$

i.e., in a worst case, 7.8% to the total cost of an optimal solution to the original design problem. In fact, the solution arrived at using the method and apparatus in accordance with the invention has generally proved to be much closer to an optimal solution than this worst case prediction.

The method in accordance with the invention therefore provides a feasible solution for network planning which permits lowest cost network designs to be determined very quickly and accurately.

The method is adapted for use in cases in which there may be several types of access switches and hub switches with limited capacities. The trunk interfaces on the hub switches for connecting the network to other networks can also be included in the design if the outside traffic distribution is available.

TABLE 6

Upgrading levels for trunks in the network

| $a_{i,1,k}$ | CO1 | CO2 | CO3 | CO4 | CO5 | CO6 | CO7 | CO8 | CO9 | CO10 |
|---|---|---|---|---|---|---|---|---|---|---|
| k = 2 | 2 | 2 | 2 | 2 | 2 | 2 | 2 | 2 | 2 | 2 |
| k = 3 | 2 | 2 | 2 | 2 | 2 | 2 | 2 | 2 | 2 | 2 |
| k = 4 | 2 | 1 | 2 | 1 | 2 | 1 | 2 | 1 | 2 | 1 |

Since the maximum number of link-type k in the trunk from the home i to the hub is $a_{i,h,k}$, the cost of this trunk with the first link-type level being k can be obtained by comparing the cost of each scenario with a trial number of the first level link-type from 1 to $a_{i,h,k}-1$. The minimum cost associated with this trunk is the lowest cost of all the scenarios as k changes from 1 to 5. This process is applied to each trunk, and yields the following table:

The preferred embodiment described above is intended to be exemplary only. The scope of the invention is intended to be limited only by the scope of the appended claims.

What I claim is:

1. A method of planning an ATM network for an area of concentrated demand for bandwidth, comprising:
    configuring homes in the network into a star topology having a single hub; and

TABLE 7

Sizes of all trunks in the network

| $Z_{i,1,k}$ | CO1 | CO2 | CO3 | CO4 | CO5 | CO6 | CO7 | CO8 | CO9 | CO10 |
|---|---|---|---|---|---|---|---|---|---|---|
| OC48 | 0 | 0 | 0 | 0 | 0 | 0 | 0 | 0 | 0 | 0 |
| OC12 | 2 | 0 | 0 | 0 | 0 | 0 | 0 | 0 | 0 | 0 |
| OC3 | 0 | 3 | 3 | 3 | 3 | 3 | 3 | 2 | 0 | 0 |
| DS3 | 0 | 0 | 0 | 0 | 0 | 0 | 0 | 0 | 3 | 0 |
| DS1 | 0 | 0 | 0 | 0 | 0 | 0 | 0 | 0 | 0 | 9 | linking together with direct links all pairs of homes having at least a predefined minimum of inter-nodal traffic, wherein the type of link used for links in the network is governed by two constraints, namely:
a) a threshold for upgrading link-type k is $\Delta_k$; and
b) at most two consecutive link types can be used to dimension a trunk.

2. The method of planning an ATM network as claimed in claim 1 wherein the area of concentrated demand for bandwidth is a metropolitan area.

3. The method of planning an ATM network as claimed in claim 1 wherein a least cost network design is computed by:
a) designating each home (1, ... n, where n is the number of homes in the network) as the hub and computing a total cost for a resulting network plan (1, ... n) times; and
b) selecting a least cost network plan from among the n network plans.

4. A method of planning an ATM network for an area of concentrated demand for transport bandwidth, the network plan being a near optimal lowest cost solution, comprising the steps of:
a) determining a number of homes required to terminate customer traffic to the ATM network;
b) determining an aggregated projected customer demand between homes in the network;
c) designating one of the homes as the home at which a hub for the network is to be located;
d) determining a number of direct links for interconnecting homes having a predefined minimum of projected inter-nodal customer traffic, and determining a size of inter-nodal links required between the homes;
e) determining a total volume of customer traffic from each home to the hub and from the hub to each home;
f) determining a link size between each home and the hub without regard to interface termination requirements on the hub or the homes;
g) determining each home access switch and hub gateway switch configuration given all link sizes;
h) computing a total cost for the network plan and storing the cost in a memory along with a unique network plan identifier;
i) designating another home which has not been designated as a hub for the network and repeating steps d)–h) until all homes have been designated as hub; and
j) examining the memory to select a lowest cost from among the costs stored in the memory and identifying the lowest cost plan using the unique plan identifier associated with the lowest cost.

5. A method of planning an ATM network for an area of concentrated demand for transport bandwidth as claimed in claim 4 wherein the area is a metropolitan area.

6. A method of planning an ATM network for an area of concentrated demand for transport bandwidth as claimed in claim 4 wherein the unique network plan identifier comprises a code used to identify the home in the network which serves as the hub, each home in the network being assigned a unique code in step a).

7. A method of planning an ATM network for an area of concentrated demand for transport bandwidth as claimed in claim 4 wherein the determination in step e) is expressed as:

$$Q_1 = \max\left\{\sum_{j=1}^{n} COI_{h,j} + COI_{outside,h}, \sum_{j=1}^{n} COI_{j,h} + COI_{outside,j}\right\};$$

Variables:
$Q_j$: total traffic for the trunk from home j to the hub;
$COI_{h,j}$: total traffic demand from hub h to home j (Mbps)
$COI_{outside,h}$: total traffic demand from outside network to hub h (Mbps);
$COI_{j,h}$: total traffic demand from home j to hub h (Mbps);
$COI_{outside,j}$: total traffic demand from outside network to home j (Mbps).

Parameters
h: network home designated as hub;
j: network homes not designated as hub;
n: number of homes in the network.

8. A method of planning an ATM network for an area of concentrated demand for transport bandwidth as claimed in claim 4 wherein the determination in step h) is expressed as:

$$\sum_{i=1}^{n}\sum_{k=1}^{m} c_k \lceil Z_{i,h^*,k}/n_k \rceil + \sum_{k=1}^{m} C_k \left\lceil \sum_{i=1}^{n} Z_{i,h^*,k}/N_k \right\rceil + \sum_{i=1}^{n}\sum_{k=1}^{m}(A_k + D_{i,h^*}T_{i,h^*,k})Z_{i,h^*,k} + C$$

Variables:
$C_k$: cost per link card on access switch;
$C_k$: cost per link card on hub switch;
$Z_{i,h^*,k}$: number of link-types for the trunk from home i to the optimal hub h*;
$n_k$: number of ports per access switch link card to terminate link-type k;
$N_k$: number of ports per hub switch link card to terminate link-type k;
$A_k$: fixed cost per unit of link-type k;
$D_{i,h^*}$: distance (in miles) from access switch i to optimal hub h*;
$T_{i,h^*,k}$: variable cost per unit of link-type k between home i and optimal hub h*;
C: hub switch starting cost.

Parameters
i: access node in the network;
h*: optimal hub in the network;
n: number of homes in the network;
k: number of link-types;
m: number of different kinds of link-types.

9. For use in cooperation with a computer having a memory, a system for planning an ATM network for an area of concentrated demand for transport bandwidth, the network plan being a near optimal lowest cost solution, comprising:
means for storing codes representative of homes required to terminate customer traffic to the ATM network;
means for storing an aggregated projected customer demand between each pair of homes in the network;
means for storing an identifier to indicate that a one of the homes is designated as the home at which a hub for the network is to be located;
means for determining a number of direct links for interconnecting each pair of homes having a predefined minimum of projected inter-nodal customer traffic, and determining a size of each inter-nodal link required;
means for determining a total volume of customer traffic from each home to the hub and from the hub to each home;

means for determining a link size between each home and the hub without regard to interface termination requirements on the hub or the homes;

means for determining each home access switch and hub gateway switch configuration given all link sizes;

means for computing a total cost for the network plan and storing the cost in a memory along with a unique network plan identifier;

means for indicating another home as a hub location and recomputing a configuration and total network cost, and storing the total cost for the network plan until all homes have been designated as a hub and a total network cost is computed for each; and means for examining the memory to select a lowest cost from among the total costs stored in the memory and displaying the lowest cost and the unique plan identifier for a user of the apparatus.

* * * * *